United States Patent [19]

Brucher

[11] 4,371,220

[45] Feb. 1, 1983

[54] SELF-LUBRICATING PLAIN BEARING

[76] Inventor: Egon Brucher, Hebelstrasse 57, D-7633 Seelbach, Fed. Rep. of Germany

[21] Appl. No.: 224,845

[22] Filed: Jan. 13, 1981

[30] Foreign Application Priority Data

Jan. 14, 1980 [DE] Fed. Rep. of Germany ....... 3001115

[51] Int. Cl.³ .................... F16C 33/82; F16N 15/00
[52] U.S. Cl. .................. 384/371; 308/DIG. 5; 308/DIG. 8; 369/269
[58] Field of Search .............. 369/269; 308/36.1, 168, 308/172, DIG. 5, DIG. 8

[56] References Cited

FOREIGN PATENT DOCUMENTS

55-119222  9/1980  Japan ......................... 308/DIG. 5

*Primary Examiner*—Steven L. Stephan
*Attorney, Agent, or Firm*—Fleit & Jacobson

[57] ABSTRACT

A self-lubricating plain bearing for a shaft has a bore in which a bearing sleeve is disposed for rotatably supporting the shaft. Disposed in the bore in a portion thereof which is further inward than the sleeve is a lubricant-impregnated porous member. The clearance between the shaft and the inside surface of the member is larger than the bearing clearance between the shaft and the bearing sleeve and lubricant is drawn by capillary action from the member into the clearance and then into the bearing clearance.

13 Claims, 1 Drawing Figure

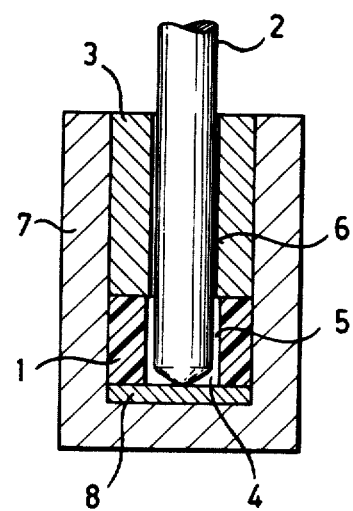

SELF-LUBRICATING PLAIN BEARING

BACKGROUND OF THE INVENTION

In many situations there is a requirement for a self-lubricating plain bearing, firstly because a plain bearing is cheap and easy to produce and generally reliable and efficient in operation provided it has sufficient lubrication, and secondly because the self-lubricating facility gives the continued lubrication referred to above as a requirement in a plain bearing, without necessitating dismantling of the bearing.

One form of self-lubricating plain bearing comprises a metal capillary bearing member formed from metal powder with or without graphite by pressing under a high pressure in a mold, followed by sintering in a hydrogen atmosphere. In operation of the bearing the lubricant is sucked out of the pores of the bearing member and supplied to the bearing surface of the sintered member and the shaft, by the rotating shaft, as a result of suction and an increase in temperature, due to capillary action, according to the speed of rotation of the shaft. This arrangement also includes additional lubricant reserve means, for example in the form of a felt ring, deposits of lubricant or grease and the like. It is also necessary to collect lubricant, such as oil, which escapes from the bearing, and felt discs or suitably shaped centrifuging rings are used for this purpose. In a plain bearing of that kind however, there is the danger that a satisfactory film of lubricant may not be formed when the speed of rotation of the shaft is low and also when the shaft is stationary, so that metal-to-metal contact may occur, with evident detriment to the bearing surfaces, whereby the bearing arrangement does not always provide the noise-free and smooth running which is generally a requirement in such bearings.

In other plain bearings of the above-mentioned kind, in the form of kinematic swivel joints, in which the sliding bearing surfaces are of a cylindrical, tapered or spherical configuration, the bearing runs smoothly, but it has to be re-lubricated from time to time in order to maintain the original bearing quality.

SUMMARY OF THE INVENTION

An object of the invention is to provide a plain bearing with a self-lubricating facility.

Another object of the invention is to overcome the disadvantages of previous self-lubricating plain bearings.

Yet another object of the invention is to provide a self-lubricating plain bearing which eliminates actual destructive contact between the co-operating bearing surfaces at low or zero speed of shaft rotation.

Still another object of the invention is a self-lubricating bearing whose dimensional factors are adapted to assume satisfactory lubrication of the bearing surface even at slow shaft rotation.

A further object of the invention is a self-lubricating plain bearing which, while providing smooth running due to satisfactory lubrication, comprises components which require only comparatively simple operations for manufacture thereof.

These and other objects are achieved according to the invention by a self-lubricating plain bearing assembly comprising a body portion having therein a bore for receiving a portion of a shaft. Disposed in the bore is a porous member which is arranged at an inner portion of the bore and which occupies only a part of the bore in the axial direction thereof; the porous member in use of the bearing is impregnated with lubricant and surrounds the shaft at a clearance therefrom. A bearing surface means such as a sleeve for supporting the shaft is disposed in the bore adjacent to the porous member and extends outwardly of the bore from the porous member. The bearing surface means has a bearing clearance from the shaft therein, and the clearance between the shaft and the inside surface of the porous member is larger than the bearing clearance between the shaft and the co-operating surface of the bearing surface means whereby lubricant in the porous member flows by capillary action out of the clearance between the porous member and the shaft into the bearing clearance between the shaft and the bearing surface means.

The mean size of the pores in the porous member may be larger than the clearance between the shaft and the porous member, while the capillary flow suction action applied to the lubricant to cause it to flow into said bearing clearance is adapted to the relationship $S_{12} > S_{13} > S_3$, wherein $S_{12}$ is the suction capability of the bearing clearance between the shaft and the bearing surface means, $S_{13}$ is the suction capability of said clearance between the shaft and the porous member, and $S_3$ is the suction capability of the porous member. The porous member may be a sintered member produced from a starting material, such as spheroidal bronze, which is sintered in a relatively loose condition without additional pressure applied thereto. The shaft-porous member clearance is preferably from 0.096 to 0.201 mm, while the bearing clearance may be 0.021 to 0.039 mm, with a porous member grain size of from 0.5 to 0.71 mm.

The viscosity of the lubricant oil is adapted to the bearing configuration, being for example 62 cST/8.2E.

The invention also provides a disc record player including such a bearing for supporting the record player turntable shaft which is adapted to be driven in rotation by a drive motor.

BRIEF DESCRIPTION OF THE DRAWING

The drawing shows a sectional view of a bearing incorporating the invention, with a shaft therein.

DESCRIPTION OF THE PREFERRED EMBODIMENT

Referring to the drawing, the bearing comprises a bearing body portion in the form of a block 7 having therein a receiving bore 4 which is closed at one end and at the bottom or closed end of which is arranged a plain support or thrust bearing member 8. A porous member 1 which may be for example a sintered member is disposed on the bearing member 8 in the bore 4, in the vicinity of the inner closed end of the bore 4. As can be readily seen from the drawing, the member 1 occupies only part of the axial length of the bore. The member 1 serves as a deposit or store for a lubricant which is impregnated in the member 1. The remaining part of the bore 4, or at least a portion of said part, receives a sleeve-shaped plain bearing member 3 for rotatably supporting and guiding a rotary shaft 2 such as a disc record player turntable shaft. The player is for example of conventional structure comprising a turntable adapted to be driven in rotation by a drive means, the turntable being supported by the shaft 2.

A bearing clearance 6 is provided in the usual manner between the shaft 2 and the bearing surface of the bearing member 3. Both the porous member 1 and the sleeve member 3 can be suitably press-fitted into the bore 4 in the bearing block 7.

As mentioned, the porous member 1 may be in the form of a sintered member whose starting material in a loose condition was sintered without additional pressure, in contrast to the sintered member of the above-discussed previously bearing member which was pressed and sintered using high pressure in a mold. A preferred material for the member 1 is a sinter material comprising spheroidal particles, more particularly bronze, thereby making it possible to produce porosity which is uniformly distributed throughout the sintered member so that there is substantially no possibility of regions of different suction capability within the porous member. In general, suitable materials for forming the porous member 1 are loosely sintered balls of metal, plastic material, glass, ceramic or one or more other solid substances which are cemented together, welded together or sintered without pressure. Other suitable materials are open-pore foam substances, the cavities of which can be defined with sufficient precision in respect of size and shape, by their production method.

The inner surface of the porous member 1 and the peripheral surface of the shaft 2 are not in contact with each other but have a clearance 5 therefrom. As can be seen from the drawing, the clearance 5 between the surface of the member 1 and the shaft is larger than the clearance 6, although the clearance 5 is smaller than the size of the pores in the porous member 1. The above-described relative dimensions in respect of the clearance 5 and 6 and the pores in the member 1 give a graduated suction action on the lubricant, which is also of a given viscosity or viscosity range, as referred to below, in such a way that the suction capability or action of the clearance 6 on the lubricant is greater than the suction capability or action of the clearance 5 which in turn applies to the lubricant a greater suction action than the porous member 1. This arrangement therefore ensures continuous lubrication of the surfaces at the bearing clearance 6, even at low speeds of rotation as frequently occur for example in a disc record player.

In the illustrated arrangement therefore, the lubricant is of such a viscosity that it can pass out of the clearance 5 between the porous member 1 and the shaft 2 into the bearing clearance 6 between the sliding surface of the member 3 and the shaft 2, as a result of capillary action. The shaft 2 does not touch the porous member 1 so that no metal-to-metal friction occurs, even at low speeds of shaft rotation.

Furthermore, the arrangement illustrated ensures that the bearing clearance 6 between the shaft 2 and the member 3 is not sucked empty of lubricant by the suction effect of the porous member 1, after assembly of the bearing or when the shaft is stationary or rotating at low speeds.

In addition, the illustrated arrangement ensures that lubricant, for example oil, does not in normal operation escape from the bearing as the porous member 1 which performs the function of a lubricant store is arranged in the interior of the receiving bore 4, that is to say, it is screened or shielded from the exterior by the member 3. This means that the bearing does not require collecting means such as centrifuging rings and felt discs which are otherwise provided to collect any lubricant which may escape. It is also possible to omit any additional lubricant store as the porous member 1 performs that function.

Suitable dimensions in respect of the clearance 5 between the shaft 2 and the inside surface of the porous member 1 are preferably in a range of about 0.096 to 0.201 mm, and, for the bearing clearance 6 between the shaft 2 and the surface of the member 3, in a range of from about 0.021 to 0.039 mm. In the above arrangement, the porous member 1 preferably comprises spheroidal sintered bronze with a grain size of from about 0.5 to 0.71 mm. The viscosity of the oil used as lubricant in the above arrangement is 62 cst/8.2E.

It will be seen therefore that, in the above-described bearing, even at a low speed of shaft rotation and more particularly even when the shaft is stationary, as occurs in disc record players, the bearing provides continuous lubrication of the bearing surfaces and thus retains self-lubricating qualities, so giving smooth running, without the bearing having to be periodically re-lubricated.

Various modifications may be made in the above-described arrangement without thereby departing from the spirit and scope of the present invention.

I claim:

1. A self-lubricating plain bearing for a shaft, comprising a bore for receiving the shaft; a porous member which is arranged in the bore at an inner portion thereof and which occupies only a part of the bore in the axial direction thereof, the porous member being adapted to be impregnated with lubricant and surround the shaft at a clearance therefrom; and a bearing surface means adapted to support the shaft, which is disposed in the bore adjacent to the porous member and which extends outwardly therefrom, the bearing surface means having a bearing clearance from the shaft therein, the clearance between the shaft and the porous member being larger than the bearing clearance between the shaft and the bearing surface means, and the pore size of the porous member being larger than said clearance between the shaft and the porous member, whereby lubricant in the porous member flows by capillary action out of the clearance between the porous member and the shaft into the bearing clearance between the shaft and the bearing surface means.

2. A bearing as set forth in claim 1 wherein the capillary flow suction action applied to the lubricant to cause it to flow into said bearing clearance is adapted to the relationship $S_{12} > S_{13} > S_3$, wherein $S_{12}$ is the suction capability of the bearing clearance between the shaft and the bearing surface means, $S_{13}$ is the suction capability of said clearance between the shaft and the porous member, and $S_3$ is the suction capability of the porous member.

3. A bearing as set forth in claim 1 wherein the porous member is a sintered member formed by sintering material in a loosely mixed condition without the application of additional pressure.

4. A bearing as set forth in claim 3 wherein said starting material of the sintered member comprises spheroidal particles.

5. A bearing as set forth in claim 1 wherein said clearance between the shaft and the porous member is from about 0.096 to 0.201 mm.

6. A bearing as set forth in claim 1 wherein said bearing clearance between the shaft and the bearing surface means is in a range of from about 0.021 to 0.039 mm.

7. A bearing as set forth in claim 1 wherein the porous member comprises spheroidal sintered bronze.

8. A bearing as set forth in claim 7 wherein the grain size of said porous member material is from 0.5 to 0.71 mm.

9. A bearing as set forth in claim 1 wherein the porous member is impregnated with a lubricant in the form of an oil having a viscosity of 62 cST/8.2E.

10. A self-lubricating plain bearing for a shaft, comprising a body having a bore therein for receiving an end portion of said shaft, a bearing sleeve means disposed within the bore for supporting the shaft and having a bearing clearance therefrom, and a porous, lubrication-impregnated member which is disposed in the bore at the end of said bearing sleeve means and which is closer towards said shaft end portion, the porous member having a clearance from said shaft which is greater than said bearing clearance, and the bore size of the porous member being larger than said clearance between the shaft and the porous member, whereby said clearance between said shaft and said porous member is adapted to draw lubricant from said porous member and said bearing clearance is adapted to draw lubricant from said clearance to cause lubricant to flow by capillary action to the co-operating bearing surfaces of said shaft and said bearing sleeve means.

11. A bearing as set forth in claim 10 wherein said porous member comprises spheroidal sintered bronze.

12. A bearing as set forth in claim 10 wherein the porous member is impregnated with a lubricant in the form of an oil having a viscosity of 62 cST/8.2E.

13. In a device comprising a shaft and a member carried by said shaft and adapted to be rotated therewith, a self-lubricating bearing comprising: a support means defining a bore receiving a portion of said shaft; a lubricant-impregnated porous member which is arranged in the bore at an inner portion thereof and which occupies only a part of the bore in the axial direction thereof, and which surrounds the shaft at a clearance therefrom; and a bearing surface means adapted to support the shaft, which is disposed in the bore adjacent to the porous member and which extends outwardly therefrom, the bearing surface means having a bearing clearance from the shaft therein, the clearance between the shaft and the porous member being larger than the bearing clearance between the shaft and the bearing surface means, and the pore size of the porous member being larger than said clearance between the shaft and the porous member, whereby lubricant in the porous member flows by capillary action out of the clearance between the porous member and the shaft into the bearing clearance between the shaft and the bearing surface means.

* * * * *